(12) United States Patent
Caldwell et al.

(10) Patent No.: US 8,189,549 B2
(45) Date of Patent: May 29, 2012

(54) SYSTEM AND METHOD FOR INDICATING A SUBSCRIBER'S ZONE WITHIN CONVERGED TELECOMMUNICATIONS NETWORKS

(75) Inventors: Christopher E. Caldwell, Woodstock, GA (US); Janne P. Linkola, Espoo (FI)

(73) Assignee: T-Mobile USA, Inc., Bellevue, WA (US)

(*) Notice: Subject to any disclaimer, the term of this patent is extended or adjusted under 35 U.S.C. 154(b) by 549 days.

(21) Appl. No.: 12/399,793

(22) Filed: Mar. 6, 2009

(65) Prior Publication Data

US 2009/0196268 A1 Aug. 6, 2009

Related U.S. Application Data

(63) Continuation-in-part of application No. PCT/US2007/082156, filed on Oct. 22, 2007.

(51) Int. Cl.
*H04W 4/00* (2009.01)
*H04M 11/00* (2006.01)
*H04B 7/00* (2006.01)

(52) U.S. Cl. ......... 370/338; 370/328; 455/405; 455/525

(58) Field of Classification Search ............. 370/328, 370/338; 455/405–408, 422.1–460, 524, 455/525; 705/1.1, 400
See application file for complete search history.

(56) References Cited

U.S. PATENT DOCUMENTS

| | | | |
|---|---|---|---|
| 5,475,677 A | 12/1995 | Arnold et al. | |
| 6,002,679 A | 12/1999 | Liu et al. | |
| 6,687,360 B2 | 2/2004 | Kung et al. | |
| 6,768,726 B2 | 7/2004 | Dorenbosch et al. | |
| 6,775,267 B1 | 8/2004 | Kung et al. | |
| 7,369,850 B2 | 5/2008 | Andrew et al. | |
| 7,646,745 B2 | 1/2010 | Caldwell et al. | |
| 2004/0204133 A1 | 10/2004 | Andrew et al. | |
| 2005/0148342 A1 | 7/2005 | Sylvain | |
| 2005/0176429 A1 | 8/2005 | Lee et al. | |
| 2005/0197156 A1 | 9/2005 | Fourquin et al. | |
| 2006/0025146 A1 | 2/2006 | Gallagher et al. | |
| 2006/0046714 A1 | 3/2006 | Kalavade | |
| 2006/0052113 A1* | 3/2006 | Ophir et al. | 455/456.1 |
| 2006/0095954 A1 | 5/2006 | Buckley et al. | |
| 2006/0172732 A1 | 8/2006 | Nylander et al. | |
| 2006/0252424 A1* | 11/2006 | Ohno et al. | 455/432.1 |
| 2007/0189254 A1* | 8/2007 | Tariq et al. | 370/338 |
| 2007/0191001 A1* | 8/2007 | Tariq et al. | 455/426.1 |

(Continued)

FOREIGN PATENT DOCUMENTS

EP 0781064 A 6/1997

(Continued)

OTHER PUBLICATIONS

International Search Report and Written Opinion, International Application No. PCT/US2010/026411, Filed on Mar. 5, 2010, Applicant: T-Mobile USA, Inc., Date of Mailing Oct. 15, 2010, 9 pages.

(Continued)

*Primary Examiner* — Ricky Ngo
*Assistant Examiner* — Paul H Masur

(57) ABSTRACT

A system and related method provide a registration request via an access point, wherein the access point is associated with a defined service zone. In response, an authorization signal to access telecommunications services is received. The authorization signal includes service zone name data for the service zone and/or at least one service zone icon indicator for the service zone. Further details are described herein.

36 Claims, 4 Drawing Sheets

U.S. PATENT DOCUMENTS

| | | | |
|---|---|---|---|
| 2007/0243872 A1* | 10/2007 | Gallagher et al. | 455/436 |
| 2008/0261602 A1* | 10/2008 | Livneh | 455/442 |
| 2009/0275332 A1* | 11/2009 | Niska et al. | 455/436 |

FOREIGN PATENT DOCUMENTS

| | | |
|---|---|---|
| EP | 1420569 A | 5/2004 |
| WO | WO-9740638 A | 10/1997 |

OTHER PUBLICATIONS

"AirStation One-Touch Secure System (AOSS™): A Description of WLAN Security Challenges and Potential Solutions," Buffalo Technology (USA), Inc., Oct. 2004, 7 pages.

Harlan, Lisa, "The Wireless LAN and HP iPaq Handheld Devices," Hewlett-Packard, Nov. 2, 2005, 85 pages.

Hougton, Mike, "Cellular Modems: 3G Access on the Move," Enterprise IP Planet: Networking for the Enterprise IT Professional, May 25, 2006, 4 pages.

International Search Report and Written Opinion, International Application No. PCT/US2007/82160, Filed on Oct. 22, 2007, Applicant: T-Mobile, Inc., Date of Mailing Mar. 4, 2008, 8 pages.

International Search Report and Written Opinion, International Application No. PCT/US2007/072591, Filed on Jun. 29, 2007, Applicant: T-Mobile USA, Inc., Date of Mailing Apr. 14, 2008, 19 pages.

Silvetti, Marianne, "User's Guide HP iPaq Pocket PC h6300 Series," Hewlett-Packard, Aug. 2, 2004, 85 pages.

\* cited by examiner

SYSTEM AND METHOD FOR INDICATING A SUBSCRIBER'S ZONE WITHIN CONVERGED TELECOMMUNICATIONS NETWORKS

CROSS-REFERENCE TO RELATED APPLICATION(S)

This application is a continuation-in-part of the assignee's U.S. Patent Application No. PCT/US2007/082156, filed 22 Oct. 2007.

BACKGROUND

In this digital age, modern telecommunication service providers and device manufacturers are increasingly relying on public and/or private IP networks, including the Internet, as a core part of their technology. For example, many telecommunications service providers now offer a suite of Voice over IP ("VoIP") services, as well as various data services, which utilize IP networks and/or IP-based wireless access networks (e.g., access networks based on IEEE 802.16 ("WiMAX"), IEEE 802.20 Mobile Broadband Wireless Access (MBWA), Ultra Wideband (UWB), 802.11 wireless fidelity ("Wi-Fi"), Bluetooth, and similar standards) for at least part of their infrastructure. Likewise, device manufacturers are producing the next generation of mobile devices (e.g. wireless handhelds, wireless handsets, mobile phones, personal digital assistances, notebook computers, and similar devices) that are enabled to send and receive information utilizing IP-based telecommunications services. In fact, many of today's modern mobile devices are able to function as "dual-mode devices" that take advantage of both cellular network technologies and other wireless technologies, including IP-based technologies.

Unlicensed Mobile Access (UMA) technology has developed as part of this trend to incorporate IP solutions into mobile device telecommunication systems. UMA technology has been accepted into Release 6 of the 3rd Generation Partnership Project (3GPP) and is also referred to as Generic Access Network (GAN) technology. In various implementation schemes, UMA allows wireless service providers to merge cellular networks (such as Global System for Mobile Communications (GSM)) networks and IP-based wireless networks into one seamless service (with one mobile device, one user interface, and a common set of network services for both voice and data). One goal of UMA is to allow subscribers to move transparently between cellular networks and IP-based wireless networks with seamless voice and data session continuity, similar to how they can transparently move between cells within cellular networks. Seamless in-call handover between the IP-based wireless network and the cellular network ensures that the user's location and mobility do not affect the services delivered to the user.

At an operational level, UMA technology effectively creates a parallel radio access network, the UMA network, which interfaces to the mobile core network using standard mobility-enabled interfaces. For example, UMA can replace a system's GSM radio technology on the lower protocol layers with a wireless LAN, or similar technology. A call or other communication may be tunneled to the Mobile Switching Center (MSC) of a service provider via an access point (e.g., a WiFi access point connected to a modem via the Internet) and gateway (e.g., a UMA network controller). In many cases, the mobile core network remains unchanged, making it much easier to maintain full service and operational transparency and allowing other aspects of the service infrastructure to remain in place. For example, in many systems that utilize UMA, the existing service provider's business support systems (BSS), service delivery systems, content services, regulatory compliance systems, and operation support systems (OSS) can support the UMA network without change. Likewise, service enhancements and technology evolution of the mobile core network apply transparently to both cellular access and UMA.

As the incorporation of IP solutions, such as UMA, into mobile device telecommunication systems expands, wireless service providers and wireless users have the opportunity to provide additional customized services. For example, a WiFi access point to which IP-based wireless telecommunications subscribers are connected may be interesting to a service provider because certain assumptions can be made about the subscribers using that access point. If a service provider could effectively and efficiently take actions based on assumptions derived from how or where an IP-based wireless telecommunications subscriber was connected, the wireless experience could be enhanced measurably.

The transparency of UMA is refreshing and is similar to access on most licensed cellular telephone networks. Within licensed cellular networks, users may move from cell-to-cell while maintaining a continuous communication, and even roam into areas covered by other wireless service providers. UMA offers similar mobility: users may mover from access point to access point, or from cell to access point and vice versa. However, such transparency and freedom of movement within and among networks can lead to certain difficulties. For example, when a subscriber moves out of his or her home network, and is roaming on a cellular network operated by a different wireless service provider, the user's phone may often indicate such a transition, and may display the service provider for the new network. Additional charges may apply. Under UMA, however, the user may not know that they have transitioned from access via a WiFi access point using unlicensed spectrum, to access via licensed spectrum on a cellular network, or vice versa, or even between two different access points. The user may not know, for example, if he or she is connected to his or her home or office access point, or that of a neighbor or neighboring business.

The need exists for a system that overcomes the above problems, as well as one that provides additional benefits. Overall, the examples herein of some prior or related systems and their associated limitations are intended to be illustrative and not exclusive. Other limitations of existing or prior systems will become apparent to those of skill in the art upon reading the following Detailed Description.

DETAILED DESCRIPTION

A method and system for providing an indication on a handset of zone information is described below. In one example, the zone information indicates to a subscriber whether the handset is being used with a WiFi access point that provides free or reduced pricing services, or a WiFi access point that charges for access to services. An icon such as a dollar sign may indicate that calls are being charged. Information about the service zone displayed to the user may be stored (e.g. in a call detail record) so that customer care representatives can use the information to resolve possible billing disputes.

The following description provides specific details for a thorough understanding of, and enabling description for, various embodiments of the technology. One skilled in the art will understand that the technology may be practiced without these details. In some instances, well-known structures and functions have not been shown or described in detail to avoid unnecessarily obscuring the description of the embodiments of the technology. It is intended that the terminology used in the description presented below be interpreted in its broadest reasonable manner, even though it is being used in conjunction with a detailed description of certain embodiments of the technology. Although certain terms may be emphasized below, any terminology intended to be interpreted in any restricted manner will be overtly and specifically defined as such in this Detailed Description section.

Sample Network Configurations

Figure 1:
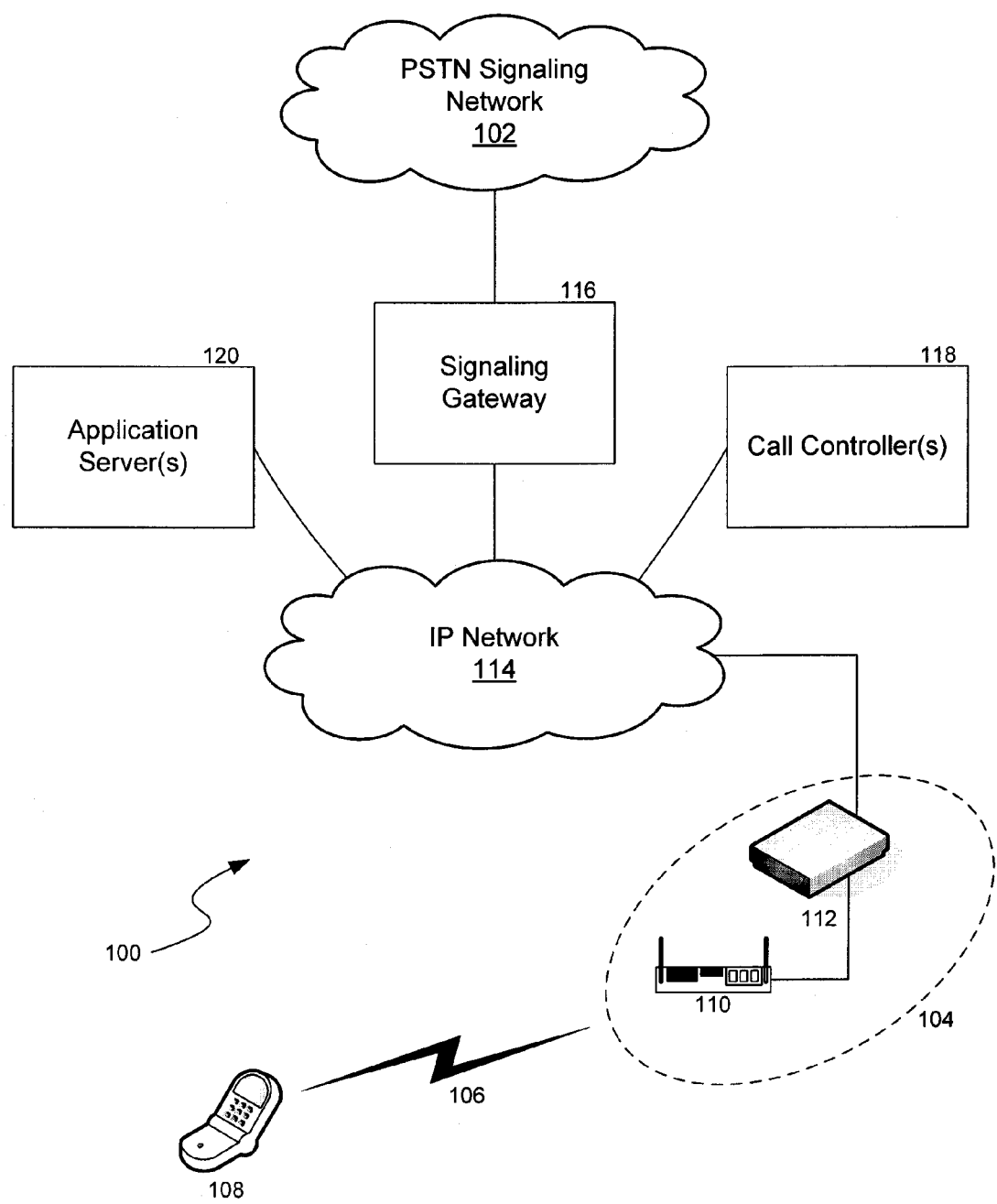
FIG. 1 illustrates aspects of a sample network system that allows VoIP-based communications in conjunction with a public switched telephone network (PSTN).
Figure 2:
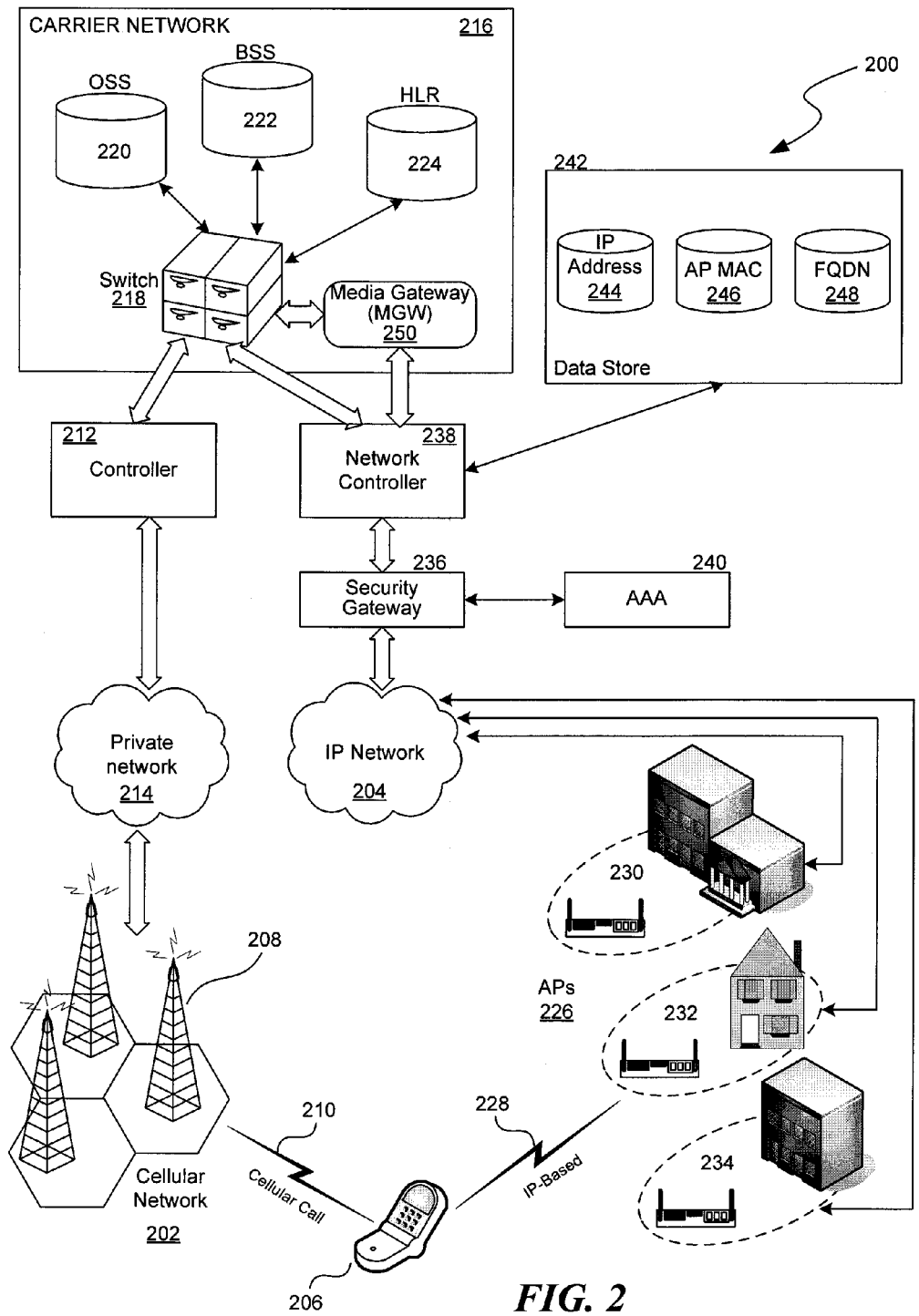
FIG. 2 illustrates an example converged wireless network system that combines a cellular network with an IP-based wireless telecommunications network.

FIGS. 1 and 2 show sample network system configurations in which aspects of the present invention can be implemented. FIG. 1 illustrates aspects of a sample network system 100 that allows VoIP-based communications in conjunction with a public switched telephone network (PSTN) 102. The system 100 includes at least one wireless access point 104, such as a WiFi access point or a femtocell. The access point 104 may be public or private, and may be located, for example, in a subscriber's residence (e.g., home, apartment or other residence), in a public location (e.g., coffee shops, retail stores, libraries, or schools) or in corporate or other private locations. In the sample system of FIG. 1, the access point 104 can accept communications 106 from at least one suitably configured telecommunications device 108 (e.g., a VoIP device). (The terms "telecommunications device", "handset", "mobile device" and the like are generally used interchangeable herein.) Various examples of network technology that may be involved in communicating between the telecommunications device 108 and the access point 104 include the IEEE 802.16 (WiMAX), IEEE 802.20 Mobile Broadband Wireless Access (MBWA), Ultra Wideband (UWB), 802.11 wireless fidelity (Wi-Fi), Bluetooth standards, or other wireless protocols. The access point 104 shown includes a wireless router 110 and a broadband modem 112 that enable connection to an Internet Protocol (IP) network 114. The IP network 114 may comprise one or more public networks, private networks, or combination of public and private networks.

In a communication or set of communications 106, the access point 104 receives IP packets from the telecommunications device 108. These IP packets are then transported through the IP network 114 to a signaling gateway 116, which in the example of FIG. 1, is operated by a telecommunications service provider. At the signaling gateway 116, the IP packets are converted to a traditional phone service signal. The phone service signal is then conveyed to a recipient via the PSTN 102.

The network system 100 of FIG. 1 also includes a call controller 118 that provides call logic and call control functions for communications sent through the system and an application server 120 that provides logic and execution of one or more applications or services offered by the telecommunications service provider, such as applications that implement various access and security rules. In some embodiments, aspects of the zone information may be determined with the mapping and processes, as described in more detail below with respect to FIGS. 3-4. In this example, a telecommunication service provider manages both the call controller 118 and the application server 120.

FIG. 2 illustrates a sample network system 200 in which aspects of the access point management facility can be implemented within a cellular telephone-type network. In general, with respect to the network system described in FIG. 2, because the same cellular protocols are used in communications involving IP access points as with traditional radio towers, the cellular service provider maintains a large degree of system compatibility even though using an IP-based network. For example, the various systems of the cellular service provider that deliver content and handle mobility may not even need to be aware that a subscriber's mobile device is on an IP-based wireless telecommunications network. Instead, the various systems of the cellular service provider assume the mobile device is on its native cellular network. The IP network is, therefore, abstracted with respect to the cellular network, regardless of whether the mobile device connects to the cellular network via a base station (e.g., for licensed spectrum access) or a wireless access point (e.g., for licensed, semilicensed and/or unlicensed spectrum access—such as spectrums for IP-based wireless telecommunications). Likewise, at a protocol level, because the same cellular protocols are used in communications involving the IP access points as with traditional radio towers, the cellular service provider maintains a large degree of system compatibility even though using an IP-based network.

Referring to FIG. 2, a sample network system 200 combines a cellular telephone network 202 (such as a GSM network) and an IP network 204 in a UMA-type or femtocell-type configuration that provides service to the user of a mobile device 206. Such service may include voice services, and also supplementary services such as call forwarding and call waiting, text messaging services (e.g., SMS), and data-based services like ring tone downloads, game downloads, picture messaging, email and web browsing. Further, since the mobile device 206 is connected to an IP network, all manner of data services available over such networks may be provided to the mobile device 206.

In general, the described network system 200 accepts registration requests and communication connections from the mobile device 206. The accepted registration requests can be requests to either the cellular telephone network 202 or to the IP-based network 204. Accordingly, to handle requests to the cellular telephone network 202, the cellular telephone network 202 includes one or more cell towers 208 that are configured to accept cellular communications 210 from the mobile device 206. The cell towers 208 are connected to a base station controller 212 (such as a base station controller/radio network controller (BSC/RNC)) via a private network 214. The private network 214 can include a variety of connections (not shown) such as T1 lines, a wide area network (WAN), a local area network (LAN), various network switches, and other similar components.

The base station controller 212 controls communication traffic to a carrier core network 216, where all communications are managed (including both cellular and IP-based). Components of the carrier core network 216 in this example include a switch (e.g., a mobile switching center or MSC) 218, which is configured to control data/call flows and perform load balancing, as well as other functions. The carrier core network 216 may also include a variety of system databases such as an operation support subsystem (OSS) database 220, a business support system (BSS) database 222, and home location register (HLR) 224 or other central subscriber database that contains details of a carrier's subscribers for billing, call logging, etc.

The sample network system 200 of FIG. 2 further includes one or more access points 226 that can accept IP-based communications 228 from the mobile device 206. For example, each access point 226 can be configured as part of a wireless network in one or more locations such as a public network 230, a home network 232, or a private business network 234. Each access point 226 is coupled to the IP network 204 through, for example, a broadband connection (not shown) such as a DSL (Digital Subscriber Line) modem, a cable modem, a satellite modem, or any other broadband device.

When the mobile device 206 attempts to access the IP network 204 (i.e., to initiate an IP-based communication), information (e.g., data, voice, SMS, etc.) is initially formatted in the cellular system's 202 native protocol and then encapsulated into Internet Protocol (IP) packets, which are transmitted to the access point 226 and routed through the IP network 204 to a security gateway 236. In contrast to non-IP communication requests, such transmissions bypass the cellular telephone system's 202 existing network of radio towers. The security gateway 236 controls access to a network controller 238, which communicates with a data store 240 for logging and accessing communications data. Thus, one function of the network controller 238 is to manage access to the carrier network 216 when dealing with an IP-based communication (in a similar manner to that performed by the base station controller 212 for a non-IP-based communication).

In one example, authentication of a request for access by the mobile device 206 over the IP network 204 is handled by the security gateway 236, which communicates with an authentication, access and authorization (AM) module 240 that is most likely associated with the carrier network 216. Challenges and responses to requests for access by the mobile device 206 are communicated between the HLR 224 and the MA module 242. When authorization is granted, the security gateway 236 communicates the assignment of an IP address to the mobile device 206 that requested access. Once the security gateway 236 passes the IP address to the mobile device 206, the public IP address assigned to the mobile device 206 is passed to the network controller 238.

In another authorization example, upon receiving an identifier from the mobile device 206, the network controller 238 may query the data store 242 to determine if the mobile device 206 is authorized for accessing the IP network 204. Sample identifiers that may be utilized to determine access include a media access control (MAC) address associated with an access point, a mobile device or subscriber identifier (such as an International Mobile Subscriber Identifier (IMSI)), an Internet Protocol (IP) address (or "Public IP address") associated with the access point, a fully qualified domain name (FQDN), or other similar types of information. The data store 242 may be a single database, table, or list, or a combination of databases, tables, or lists, such as one for IP addresses 244, one of MAC addresses 246, and one for FQDNs 248. The data store 242 may include "blocked" identifiers as well as "authorized" identifiers. Authorized accesses to the IP-based wireless telecommunications network may be maintained by the network controller 238 in an authorized session table or similar data construct.

In some cases, the signaling portion of a communication (e.g., the portion of the communication that governs various overhead aspects of the communication such as, for example, when the call starts, when the call stops, initiating a telephone ring, etc.) is routed through the network controller 238 to the switch 218, while the voice bearer portion of the communication (e.g., the portion of the communication that contains the actual content (either data or voice information) of the communication) is routed through the network controller 238 to a media gateway 250. In other words, the media gateway 250 controls the content flow between the service provider and the mobile device 206, while the switch 218 controls the signaling flow (or controls overhead-related flow) between the service provider and the mobile device 216.

In some embodiments, a picocell may be communicatively coupled to a base station in the cellular network. The picocell is a wireless access point typically covering a relatively small area, such as within a building (e.g., office, shopping mall, train station, or the like) or within an aircraft, ship, train or other vehicle. A picocell may, for example, be analogous to a WiFi access point, except that it typically broadcasts using the licensed spectrum of an associated wireless carrier such as GSM or CDMA. The picocell serves as an access point for routing communication between a handset and the network. One or more picocells may be coupled to the BSC by way of wired or wireless connections.

Alternatively or additionally, the IP-based network may include femtocells. Femtocells are much like picocells—they broadcast within the licensed spectrum of a wireless telecommunications carrier. Femtocells are typically designed for use in residential or small business environments. Femtocells connect to the service provider's network much like UMA/GAN access points, namely over IP-based networks. Nevertheless, for simplicity of discussion, the system below employs a WiFi access point, even though any short-range wireless network node may be employed.

Service Zones Overview

The system and methods described herein can be used to translate access points and broadband Internet networks into arbitrary sets, aggregations, or zones, and then provide associated functions or services. Service zones can be used in a wide variety of ways to customize a subscriber's experience. These features can be used to, for example, indicate the availability of free calls to a subscriber when the subscriber is within a particular zone. In UMA embodiments, the UMA protocol or specification includes a "UMA Service Zone" (USZ) field. The appropriate USZ information can be found from a database using any combination of parameters. These parameters can include, as non-limiting examples, Service Zone, Service Type, Service Zone Name, Service Zone Icon, date, week day, and time of day.

Service zones may be one or more access points, typically identified by the MAC address or IP address of the associated WiFi access point, or another designator in converged cellular-IP embodiments, such as a proximate cellsite global indicator (CGI). For example, a single zone could include thousands of WiFi access points around the world, such as access points located in worldwide retail locations of a particular business, or at a single location such as a user's home. In UMA embodiments, the USZ field can be used to specify particular service zones that could be associated with specific service types. As non-limiting examples, services that can be provided may be favorable billing rates, free services (e.g., free downloadable songs or other digital content), location-based services associated with that zone (e.g., cafeteria menu associated with a cafeteria within that zone), and so forth. Zones may also be mapped to individual subscribers, so that employees within a given zone would receive certain benefits or content, whereas visitors would not.

These zones can be implemented by use of a database in the network that associates a zone designator to one or more access points or regions. Further, the database may associate particular subscribers to particular services for that zone. Subscribers may be identified uniquely by any of a variety of designators, such as mobile device or subscriber ID (such as an international mobile subscriber identifier, or IMSI), or other identifier. The database can also link to specific content or services, as well as associated rules for providing that content/service. Further details regarding UMA zones may be found in the assignee's PCT patent application number US07/82156, entitled System and Method for Determining a Subscriber's Zone Information, filed 22 Oct., 2007 (attorney docket number 31419-8034.WO).

Implementation Description

In UMA implementations, the UMA specification or protocol supports one or more UMA Service Zone (USZ) field for "UMA Service Zone Information." This field is returned to the mobile device by the UMA Network Controller (UNC) during registration. A purpose of the UMZ Service Zone Information element is to provide the mobile device with UMA Service Zone information applicable to the current location of the user. It can include at least two fields: a UMA Service Zone Name string that can be used by the UNC to indicate textual information related to the location or services associated with that location, and a UMA Service Zone Icon Indicator that can be used by the UNC to turn on various indicators at the mobile device.

The USZ for a mobile device can depend on the mobile device location and/or subscriber identity. Using the systems and methods disclosed herein, the mobile device's WiFi location can be mapped into Service Zones in the UNC, a mobile device's Service Type can be provisioned from customer care/billing systems to the UNC, and the appropriate USZ information can be found from a database using a combination of Service Zone, Service Type, date, week day, and time of day as keys. Thus, service zone information can be used in conjunction with other data such as subscriber Service Type, date, day of week, time of day as keys into a database that stores the possible Service Zone information. When the mobile device registers with the network, the appropriate USZ is determined from this database. Thus, the particular USZ could depend on both location and mobile device. Some or all of the mappings described herein can be performed through the use of one or more databases.

Physical access points and broadband networks can be mapped to service zones. For example, a service zone can be defined in any of at least three ways: (1) by access point MAC address or collection of access point MAC addresses, (2) by IP address or range of IP addresses, or (3) by fully qualified domain name (FQDN) or partial FQDN matches. Service zones can also be associated with a CellID, such as a Cell Global Identity (CGI) value. The CellID is reported through to the billing system so that the mobile device's communication is rated correctly (e.g., a subscriber on her home IP-based network might receive a free or preferential billing plan). In some embodiments, the mapping of locations to zones can be performed in the UNC. Additionally, the subscriber's WiFi location can be mapped into a Service Zone in the UNC.

The Service Zones may be defined in a database associated with the network, such as the data store 242, or customer care or billing system databases (not shown). As noted below, a table or other data structure associates a number or other zone identifier with one or more IP address, MAC addresses, FQDNs, etc. Other Internet Protocol or non-Internet Protocol schemes could be used. In some embodiments, one or more CellIDs may be used. The zone need not be contiguous or overlapping APs, but could be scattered throughout a region, state, country, etc.

In one example, the Service Zone Information allows a service provider to offer free or reduced rate telecommunication services, such as voice calls, data services, or both, when the user is at his or her home, business or specific location and interacting with a home/business access point, but telecommunications services via other access points incur charges. In this example, billing is dependent upon location, and thus the user wishes to know whether he or she is registered with his or her home network/access point or not. Although it may seem that the user would know this by virtue of the fact that he or she is at home or not, there are instances where this may not be so obvious. For example, a user could be accessing her neighbor's access point, rather than his or her own access point, and thus be incurring charges unknowingly. By providing an icon to indicate charges for such calls through use of the Service Zone Icon Indicator, as described below, such confusion may be eliminated.

In this example, the UNC can provide information to the service provider's billing system to generate a call detail record (CDR) that includes information regarding some or all communications sessions, especially billable sessions. The CDR can include the service zone information, including an indication that the network sent a Service Zone Icon Indicator to the mobile device to indicate that a call was a toll call, and possibly include additional information in the Service Zone Name field that could provide not only an iconic image of a charge call, but details regarding that call. Then, if the user were to dispute the charge, the CDR would include sufficient details regarding that call. (While the term "call" is used herein, any type of connection or session is envisioned, including a voice call, data communications session, and so forth.)

The system, thus, employs signaling during call set-up between the UNC (network controller 238) and, for example, the mobile switching center (MSC; switch 218). This signaling results in the MSC (or other network element) recording a specific cellular global identifier (CGI) value in the CDR. This value may be used by not only the billing system, but also a customer care operator to display at a customer care call center terminal (not shown) all details regarding that call, including where the connection took place since access points may be assigned their own CGI values (or have their MAC addresses included with the transmitted CGI field).

Figure 3:
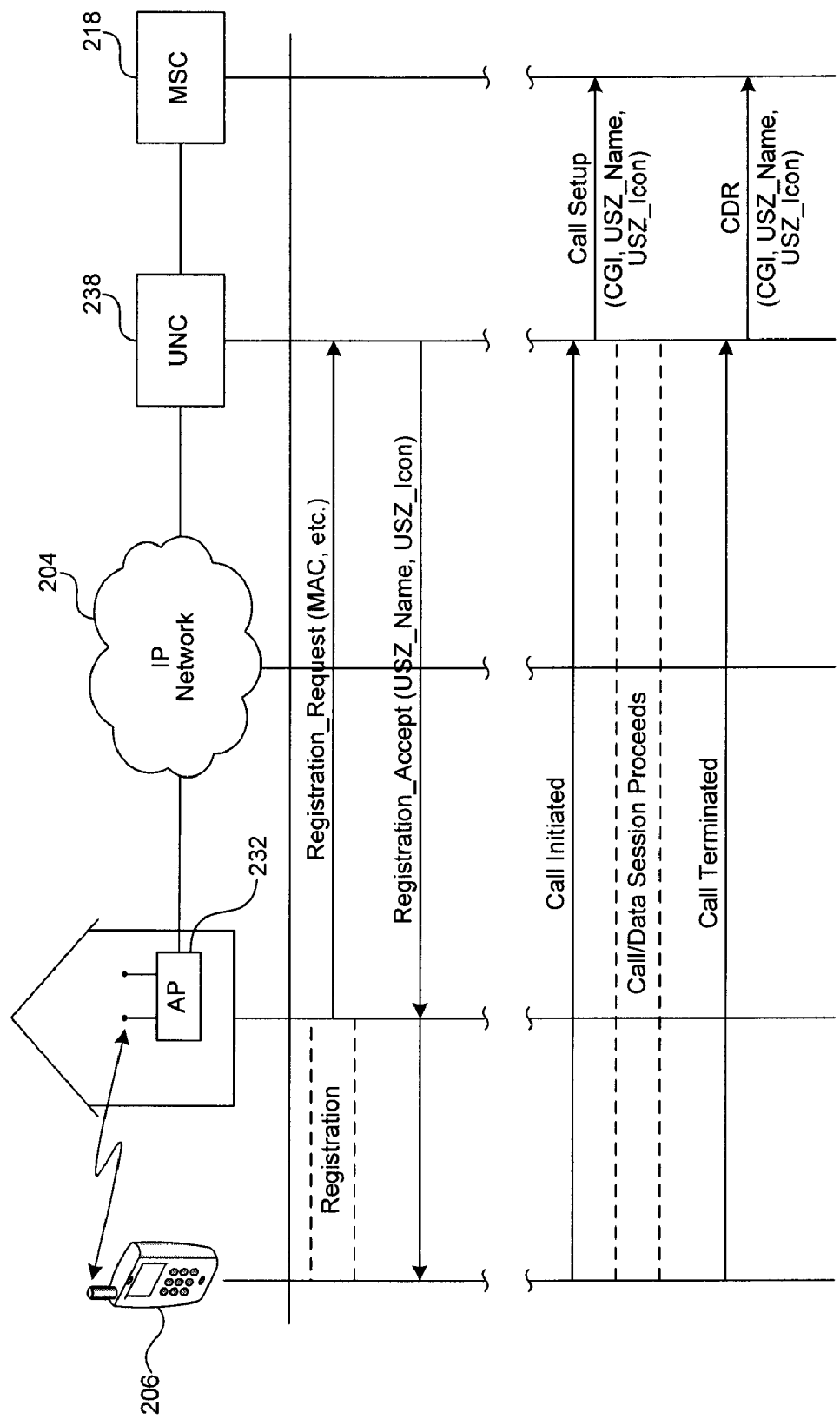
FIG. 3 is a partial block, partial flow diagram, call flow diagram illustrating an exchange of messages within the system.

Referring to FIG. 3, an example of a call session is shown. The call begins with a registration session where the mobile device 206 attempts to register with the UNC 238 via the access point 232. In a Registration_Request message, the MAC address and/or other identifying data is sent to the UNC 238 for authorization. In this example, the MAC address is used by the UNC 238 to check a database to determine an appropriate service zone associated with the access point, and to obtain the Service Zone Information from the database. In response, the UNC 238 provides a Registration_Accept message that returns the appropriate UMA Service Zone Name text string and UMA Service Zone Icon Indicator obtained from the database ("USZ_Name" and "USZ_Icon", respectively).

Some time later, the mobile device 206 initiates a call via the UNC 238, which in turn sends a call set-up message to the MSC 218. The call set-up message includes the CGI value or field for the access point 232, which can include the USZ_Name and USZ_Icon fields. The call (or data session) then proceeds until terminated. Upon termination, the UNC 238 provides call detail record (CDR) data that can again include the CGI value with the USZ_Name and/or USZ_Icon values. The MSC, in response, stores the CDR data in a billing database (e.g. database within the carrier's network 216).

Under this example, the mobile device 206 is provided with the UMA Service Zone Name string (such as a name associated with the WLAN for the access point 232) and a UMA Service Zone Icon Indicator, during initial network registration for the mobile device 206 with the UMA network. UMA service information is then kept with session data during each call that is later initiated by the mobile device once it has been registered with the UMA network. The session data may be pushed into the CGI field during call setup so that when the call terminates, the CDR is created with the CGI field data and stored in the billings record database with all details regarding the call, including what service zone text was provided to the mobile device, what icon was provided, along with all other information, such as time of day, day of week, length of call, and so forth.

During registration, the mobile device 206 receives the UMA Service Zone Name, which it can then display to the user. This text data may be initially stored in the UMA database (described herein). This text string may be provided to the UMA database when each access point is first registered or set up with the UMA network. Thus, when the access point 232 of FIG. 3 is first registered with the UMA network, a text field describing a new WLAN is provided by the user as a user-created text string (e.g., "CindysHomeNetwork"), which the system stores in the data store 242. Then, this text string can be provided to the mobile device during registration, e.g., for display on the mobile device.

Likewise, the UMA Service Zone Icon Indicator may be a value generated by the service provider for the UMA network and associated with one of multiple icons. In other words, the service provider can create one or more icons and associated UMA Service Zone Icon Indicator values for each icon. These icons may be stored in a table on the mobile device so that in response to receiving a particular USZ_Icon value, the device in turn looks at its locally stored table to retrieve an appropriate icon to be displayed for that USZ_Icon value.

UMA Zones Database and Suitable Process

As illustrated in the table below, a UMA Zones database can store groups of access points, IP addresses, and/or fully qualified domain names (FQDN). The database can be keyed to a unique integer field called a Zone Number. Records in the database can store at least one type of information, such as access point MAC address(es), IP address(es) or FQDN(s). For example, a database could be used to indicate that a certain business name is associated with certain MAC addresses. It is possible to store individual values, ranges of values, or use wild card values in any of the records. Entries in the UMA Zones database can be used to indicate some or all IP addresses, some or all domains (FQDNs), some or all access points associated with a particular manufacturer or service provider, such as all T-Mobile sold access points, and some or all MAC addresses that are to be used in default zones. In some embodiments, a user-friendly interface can be provided for modifying the UMA zones database.

| Field Name | Data Type | Notes |
| --- | --- | --- |
| Zone Number | Unique integer | This is the database base key |
| Zone | <IP address range> or <MAC address range> or <FQDN range> | This defines the zone. It can be an individual address or domain or a range. |
| $CGI_z$ | Text | This is the value sent to the switch to include in call detail records (CDRs) to indicate rating in this Zone. |
| USZ_Name [UMA Service Zone Name] | Text | This is the string to be sent to the mobile, which can be displayed on screen. |
| USZ_Icon [UMA Service Zone Icon Indicator] | Integer | This is the numeric indicator for a handset icon to be sent to the mobile for an associated icon to be displayed on screen. |

Figure 4:
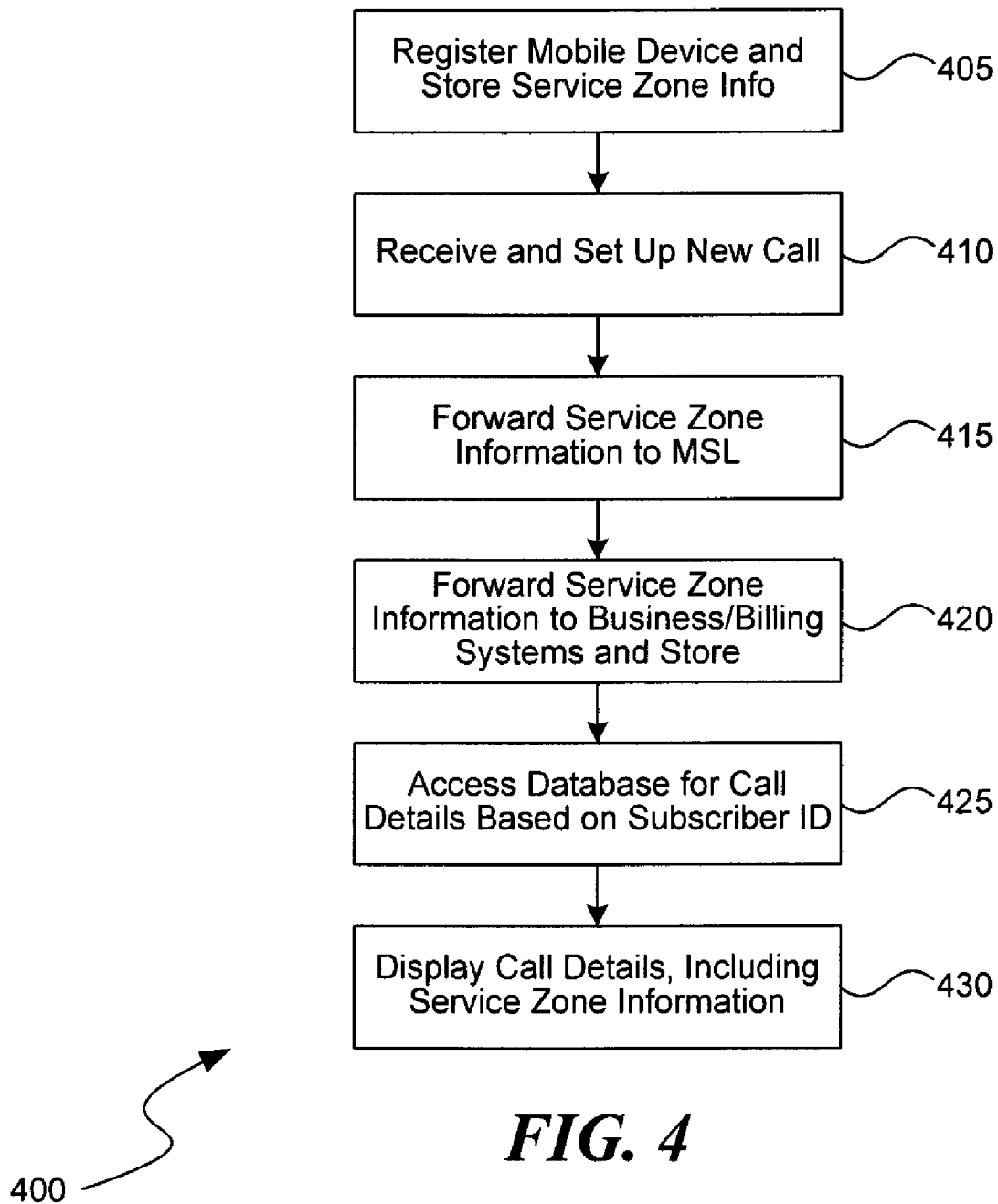
FIG. 4 is a flow chart illustrating an example of a process for indicating UMA service zone information to a mobile device.

Referring to FIG. 4, an example of a process for capturing and displaying service zone information is shown as a routine 400. Beginning in block 405, the system registers a mobile device and stores service zone information associated with that registration, in a manner similar to that described above with respect to FIG. 3. Under block 405, the UNC 238 stores the most recently provided USZ Information that has been provided to the mobile device from the current or most recent registration. This data is stored for the duration of the registration session that exists between the mobile device and the access point to which the mobile device is currently communicating. (A new session will initiate if the mobile device begins to communicate with another access point, and the process described herein repeats for that access point.)

In block 410, the system receives a request for a new call from the mobile device and sets up the new call, and in block 415, the system forwards service zone information to the MSC 218, all as noted above with respect to FIG. 3. The UNC 238 provides to the MSC 218 the stored USZ Information, such as a CGI value (which is effectively a "misuse" of the CGI parameter, but which provides important information to the MSC regarding the current call by the mobile device). In block 420, the MSC forwards the received service zone information to appropriate business and/or billing systems, where the service zone information is stored with the call data record (CDR). Under block 420, any business support system, such as a mediation or customer care system, may receive or may have access to the stored CDR, including the stored USZ Information.

In block 425, one of the business/billing systems may, at a later time, request access to the CDR from the database based on, for example, a subscriber identifier. A subscriber may, for example, call customer care to dispute a charge for a call, and may provide a MIN (mobile identification number) to the customer care agent. The agent, via a customer care terminal, then accesses the database using the MIN to access the appropriate billing record and display a CDR for the call in dispute. In block 430, the customer care computer may then display to the customer care representative all details regarding the call made under block 410, including displaying all service zone information. In other words, the system displays to the customer care representative the USZ_Text and USZ_Icon fields that were provided to the user's mobile device during the call. This can help in determining appropriate charges for the call and assist with customer care. Of course, the Service Zone Information described herein may be used in a variety of other manners.

Conclusion

Many specific details of certain embodiments of the invention are set forth in the description and in FIGS. 1-4 to provide a thorough understanding of these embodiments. A person skilled in the art, however, will understand that the invention may be practiced without several of these details and that additional details can be added to the invention. For example, some network elements are described herein as performing certain functions. Those functions could be performed by other elements in the same or differing networks, which could reduce the number of network elements. Alternatively or additionally, network elements performing those functions could be replaced by two or more elements to perform portions of those functions. Well-known structures and functions have not been shown or described in detail to avoid unnecessarily obscuring the description of the embodiments of the invention. As used herein, one or more components "coupled" to each other can be coupled directly (i.e., no other components are between the coupled components) or indirectly (i.e., one or more other components can be placed between the coupled components).

While "WiFi" and UMA is used herein as examples, the system may employ any type of wireless protocol, including wireless local, wide and metropolitan area network (WLAN, WWAN, WMAN, respectively) access protocols. For example, wireless protocols can be based on any of the 802.11 IEEE standards. Some embodiments the system can employ Bluetooth, Ultra-wideband, WiMAX, or ZigBee protocols. Further, while a particular system employing wireless devices communicating with a network server via an access point and network (e.g. the Internet), other system configurations are possible. For example, a system can include a computer that provides a physical network link to the Internet and also provides a wireless bridge to a peripheral device (e.g., a wireless device or another computer).

The invention can be practiced with other communications, data processing, or computer system configurations. The system can be implemented in environments other than the environments depicted in FIGS. 1 and 2. For example, the mobile telecommunications device described herein could be a non-IP-enabled mobile phone that connects to an IP-enabled access point that is connected to an IP-based telecommunications network over an IP network. As a second example, the mobile telecommunications device could be an analog telephone that connects to an IP-enabled terminal adaptor that is connected to an IP-based telecommunications network over an IP network. As a third example, the telecommunications device could be an IP-enabled softmobile (e.g., a personal computer having a USB device with an embedded SIM and UMA softphone application) that is connected to an IP-based telecommunications network over an IP network.

The mobile device may also include other devices, such as wearable computers, devices that perform communications functions, and any other device (or combination of devices) that is packet-switch enabled (e.g. IP-enabled), either in hardware, software, or a combination of both hardware and software. As non-limiting examples, the mobile device could be any one or combination of Internet appliances, hand-held devices (including personal digital assistants (PDAs)), wearable computers, all manner of cellular or mobile phones, multi-processor systems, microprocessor-based or programmable consumer electronics, set-top boxes, network PCs, mini-computers, mainframe computers, and the like. The terms "computer," "server," and the like are generally used interchangeably herein, and refer to any of the above devices and systems, as well as any data processor. Therefore, those of skill in the art will understand that various configurations are possible and that the facility can be implemented in a wide variety of environments.

Aspects of the system can be embodied in a special purpose computer or data processor that is specifically programmed, configured, or constructed to perform one or more of the computer-executable instructions explained in detail herein. While aspects of the system, such as certain functions, are described as being performed exclusively on a single device, the system can also be implemented in distributed environments where functions or modules are shared among disparate processing devices, which are linked through a communications network, such as a Local Area Network (LAN), Wide Area Network (WAN), or the Internet. In a distributed computing environment, program modules may be located in both local and remote memory storage devices.

Aspects of the system may be stored or distributed on tangible computer-readable media, including magnetically or optically readable computer discs, hard-wired or preprogrammed chips (e.g., EEPROM semiconductor chips), nano-technology memory, biological memory, or other data storage media. Alternatively, computer implemented instructions, data structures, screen displays, and other data under aspects of the system may be distributed over the Internet or over other networks (including wireless networks), on a propagated signal on a propagation medium (e.g., an electromagnetic wave(s), a sound wave, etc.) over a period of time, or they may be provided on any analog or digital network (packet switched, circuit switched, or other scheme).

Unless the context clearly requires otherwise, throughout the description and the claims, the words "comprise," "comprising," and the like are to be construed in an inclusive sense, as opposed to an exclusive or exhaustive sense; that is to say, in the sense of "including, but not limited to." Additionally, the words "herein," "above," "below," and words of similar import, when used in this application, shall refer to this application as a whole and not to any particular portions of this application. Where the context permits, words in the above Detailed Description using the singular or plural number may also include the plural or singular number respectively. The word "or," in reference to a list of two or more items, covers all of the following interpretations of the word: any of the items in the list, all of the items in the list, and any combination of the items in the list.

The above detailed description of embodiments of the invention is not intended to be exhaustive or to limit the invention to the precise form disclosed above. While specific embodiments of, and examples for, the invention are described above for illustrative purposes, various equivalent modifications are possible within the scope of the invention, as those skilled in the relevant art will recognize. For example, while processes or blocks are presented in a given order, alternative embodiments may perform routines having steps, or employ systems having blocks, in a different order, and some processes or blocks may be deleted, moved, added, subdivided, combined, and/or modified to provide alternative or subcombinations. Each of these processes or blocks may be implemented in a variety of different ways. Also, while processes or blocks are at times shown as being performed in series, these processes or blocks may instead be performed in parallel, or may be performed at different times.

The teachings of the invention provided herein can be applied to other systems, not necessarily the system described above. The elements and acts of the various embodiments described above can be combined or altered to provide further embodiments. Any patents and applications and other references noted above, including any that may be listed in accompanying filing papers, are incorporated herein by reference. Aspects of the technology can be modified, if necessary, to employ the systems, functions, and concepts of the various references described above to provide yet further embodiments of the technology.

These and other changes can be made to the invention in light of the above Detailed Description. While the above description describes certain embodiments of the invention, and describes the best mode contemplated, no matter how detailed the above appears in text, the invention can be practiced in many ways. Details of the system may vary considerably in its implementation details, while still being encompassed by the invention disclosed herein.

The terminology used in the Detailed Description is intended to be interpreted in its broadest reasonable manner, even though it is being used in conjunction with a detailed description of certain specific embodiments of the invention. Certain terms may even be emphasized; however, any terminology intended to be interpreted in any restricted manner will be overtly and specifically defined as such in this Detailed Description section. In general, the terms used in the following claims should not be construed to limit the invention to the specific embodiments disclosed in the specification, unless the above Detailed Description section explicitly defines such terms. Accordingly, the actual scope of the invention encompasses not only the disclosed embodiments, but also all equivalent ways of practicing or implementing the invention under the claims.

While certain aspects of the invention are presented below in certain claim forms, the applicant contemplates the various aspects of the invention in any number of claim forms. For example, while only one aspect of the invention is recited as a means-plus-function claim under 35 U.S.C sec. 112, sixth paragraph, other aspects may likewise be embodied as a means-plus-function claim, or in other forms, such as being embodied in a computer-readable medium. (Any claims intended to be treated under 35 U.S.C. §112, ¶6 will begin with the words "means for", but use of the term "for" in any other context is not intended to invoke treatment under 35 U.S.C. §112, ¶6.) Accordingly, the applicant reserves the right to add additional claims after filing the application to pursue such additional claim forms for other aspects of the invention.

We claim:

1. In a wireless telecommunications system communicating with multiple mobile devices, wherein the wireless telecommunications system includes a converged telecommunications network that employs a core telecommunications network, a cellular network, and an IP-based network, and wherein subscribers can access the IP-based network via wireless connections between mobile devices and wireless access points forming IP-based wireless local area networks (WLANs), a method performed by the wireless telecommunications system to indicate changes in charges for voice calls or for data services, the method comprising:

defining multiple service zones, wherein at least some of the service zones include one or more access points for one or more IP-based WLANs;

storing the defined multiple service zones wherein the storing includes associating with at least some of the service zones free or reduced price telecommunications services including voice calls or data services;

receiving a registration request from one of the multiple mobile devices, wherein the registration request is initially received at one of the access points for one of the IP-based WLANs, wherein the one access point is associated with a predetermined zone;

authorizing access to the core telecommunications network by the one mobile device via the one access point in the predetermined zone; and, providing to the one mobile device an authorization acceptance signal via the one access point, wherein the authorization acceptance signal includes service zone text data associated with the predetermined zone, service zone icon information associated with the predetermined zone, or both service zone text data and service zone icon information associated with the predetermined zone, and wherein the one mobile device may display to a user a change in pricing for telecommunication services associated with the predetermined zone based at least in part on the service zone text data or the service zone icon information.

2. The method of claim 1, wherein the one mobile device is a cell phone, wherein the cell phone is a dual-mode device capable of seamlessly communicating over both the cellular and IP-based networks, wherein the celluar network includes a licensed wireless cellular network, wherein the IP-based network includes an unlicensed IP-based network, wherein the one wireless access point communicates with the one cell phone under an IEEE 802.11 WLAN protocol, and wherein the WLAN protocol differs from a wireless protocol for the licensed wireless cellular network.

3. The method of claim 1, wherein the converged telecommunications network employs at least a portion of an Unlicensed Mobile Access (UMA), or Generic Access Network (GAN), or Session Initiated Protocol (SIP) protocol to communicate with the IP-based WLANs.

4. The method of claim 1, further comprising:

identifying one of multiple icons associated with multiple service zones, wherein at least some of the multiple icons are associated with different types of service associated with the multiple service zones; and, providing to the mobile device an icon value associated with the one identified icon.

5. The method of claim 1, wherein the receiving, authorizing and providing are part of a call session with the mobile device, and wherein session data, including the service zone text data, the service zone icon information, or both the service zone text data and service zone icon information, is stored in a call detail record upon termination of the call session.

6. The method of claim 1, wherein at least some of the defined service zones are associated with different service types, wherein the service types include billing rates, and wherein at least one of the service types includes free voice service for at least some mobile devices within at least one of the service zones.

7. The method of claim 1, wherein the defining multiple service zones comprises defining multiple service zones based on IP addresses or MAC addresses for access points.

8. The method of claim 1, wherein the providing includes providing an icon for display on the one handheld device based on the one service zone, wherein the icon indicates calls within the one service zone incur toll charges.

9. The method of claim 1, wherein the providing includes providing text for display on the one handheld device based on the one service zone, wherein the text indicates an amount or charges for telecommunications services within the zone.

10. In a telecommunications system communicating with multiple mobile devices, wherein the telecommunications system includes a telecommunications network employing a core telecommunications network, a cellular broadcast network, and an IP-based broadcast network, and wherein mobile devices can access the IP-based broadcast network via wireless connections with wireless access points, a method performed by a mobile device comprising:
provviding a registration request to the core telecommunications network, wherein the registration request is initially provided to one of the access points, and wherein the one access point is associated with a service zone defined within the IP-based broadcast network;
receiving access to the core telecommunications network, wherein the receiving of access includes receiving:
service zone name data associated with the service zone for the one access point,
at least one service zone icon indicator associated with the service zone for the one access point, or
both service zone name data and at least one service zone icon indicator associated with the service zone for the one access point; and,
displaying on the mobile device text associated with the service zone name data, displaying on the mobile device at least one icon associated with the at least one service zone icon indicator, or displaying on the mobile device both text associated with the service zone name data and at least one icon associated with the at least one service zone icon indicator.

11. The method of claim 10, wherein the providing of the registration request occurs during an initial authorization session between the mobile device and the one access point.

12. The method of claim 10, wherein the mobile device has a table stored therein with multiple icons each associated with one of multiple service zone icon indicator values.

13. The method of claim 10, wherein the converged telecommunications network employs at least a portion of an Unlicensed Mobile Access (UMA), or Generic Access Network (GAN), or Session Initiated Protocol (SIP) protocol to communicate with the wireless access points, and wherein the wireless access points are IP-based WLANs.

14. The method of claim 10, wherein the wireless access points include femtocells that employ licensed wireless spectrum.

15. The method of claim 10, wherein the displaying includes displaying text or an icon indicating that the access to the unlicensed network incurs charges, and wherein the mobile device is a handset configured to employ Voice over Internet Protocol (VoIP) communications.

16. In a telecommunications system communicating with multiple mobile devices, wherein the telecommunications system includes a converged telecommunications network that employs both a licensed network and an unlicensed network, and wherein subscribers can access the unlicensed network via wireless connections between mobile devices and wireless access points, a method performed by a mobile device comprising:
providing a registration request to the telecommunications system, wherein the registration request is initially provided to one of the access points, and wherein the one access point is associated with a service zone defined within the telecommunications system;
receiving access to the converged telecommunications network, wherein the receiving of access includes receiving:
service zone name data associated with the service zone for the one access point,
at least one service zone icon indicator associated with the service zone for the one access point, or
both service zone name data and at least one service zone icon indicator associated with the service zone for the one access point; and,
providing to a user of the mobile device information associated with the service zone name data, associated with the at least one service zone icon indicator, or associated with both the service zone name data and the at least one service zone icon indicator.

17. The apparatus of claim 16, wherein the access point is a wireless local area network (WLAN) access point employing an IEEE 802.11 protocol that differs from a protocol employed by the cellular network, and wherein the converged telecommunications network provides voice services under the Universal Mobile Access (UMA) or Generic Access Network (GAN) protocol.

18. The apparatus of claim 16, wherein the access point is a femtocell employing a licensed wireless communication protocol.

19. An apparatus for provisioning telecommunications services between an access point and an IP-based network in a converged telecommunications network, wherein the telecommunications services are for a subscriber's mobile device, and wherein the converged telecommunications network employs both a cellular network and the IP-based network, the apparatus comprising:
communication means for receiving a registration request signal from the access point,
wherein the registration request signal includes an identifier,
wherein the identifier includes an access point identifier received or derived from the access point, and/or a subscriber identifier received or derived from the subscriber's mobile device, and
wherein the access point is associated with at least one service zone; and,
authorizing means for selectively provisioning telecommunications services for the mobile device, and for providing to the mobile device:
service zone name data associated with the service zone for the access point,
at least one service zone icon indicator associated with the service zone for the one access point, or
both service zone name data and at least one service zone icon indicator associated with the service zone for the one access point,
wherein the service zone name data and the at least one service zone icon indicator are for displaying zone information on the mobile device.

20. A system for receiving services at a mobile device, comprising:
means for providing communications at the mobile device based on a protocol, wherein the protocol is Generic Access Network (GAN), or Unlicensed Mobile Access (UMA), or Session Initiated Protocol (SIP);
means for obtaining or providing information associated with a logical location of the mobile device in which the mobile device is currently operating, wherein the logical location is associated with a predefined service zone; and,
means for providing to the mobile device displayable information regarding the predefined service zone in which the mobile device is currently operating.

21. The system of claim 20, further comprising means for storing the information regarding the logical location of the mobile device as session data, including text or icon information provided to the mobile device during a communication session.

22. The system of claim 20, further comprising means for displaying an icon based on the predefined service zone, wherein the icon indicates to a user that a current call incurs toll charges, and wherein the mobile device is configured for Voice over Internet Protocol (VoIP) communications.

23. The system of claim 20, further comprising means for displaying text based on the predefined service zone, wherein the text indicates to a user a name associated with the predefined service zone.

24. A tangible computer-readable medium, wherein the medium is not a signal, encoded with instructions to permit a mobile telecommunications device to access telecommunications services via an access point, the instructions performing a method comprising:
  providing a registration request via the access point,
    wherein the access point is associated with a defined service zone, and
    wherein the access point is associated with an IP-based network; and,
  receiving an authorization signal for access to the telecommunications services,
    wherein the receiving of the authorization signal includes receiving:
    service zone name data for the service zone associated with the access point, or
    at least one service zone icon indicator for the service zone associated with the access point, or
    both service zone name data and at least one service zone icon indicator for the service zone associated with the access point.

25. The computer-readable medium of claim 24, further comprising:
  displaying on the mobile telecommunications device text associated with the service zone name data, displaying on the mobile device at least one icon associated with the at least one service zone icon indicator, or displaying on the mobile device both text associated with the service zone name data and at least one icon associated with the at least one service zone icon indicator.

26. The computer-readable medium of claim 24, wherein the providing comprises registering the mobile telecommunications device with a wireless node associated with a IP-based computer network that forms part of a converged telecommunications network that employs both a licensed network and an unlicensed network, wherein subscribers can access the unlicensed network via wireless connections between mobile telecommunications devices and IP-based wireless access points.

27. The computer-readable medium of claim 24, wherein the access point is a wireless node associated with an IP-based computer network, wherein the method is performed at the wireless access point, and wherein the mobile telecommunications device is a handset configured to employ Voice over Internet Protocol (VoIP).

28. A method performed by a computer having a processor, for providing telecommunications services to groups of subscribers, the method comprising:
  receiving at a network controller an access request from a mobile device, wherein the request is received via an IP-based wireless access network, and wherein the request includes a received identifier associated with a point of entry into the IP-based wireless access network for the mobile device;
  querying with the computer a database with the received identifier;
  receiving a reply from the database in response to the query, wherein the reply includes a service zone identifier associated with the received identifier; and,
  providing an output based on the service zone identifier, wherein the output includes:
    service zone name data associated with the service zone identifier,
    at least one service zone icon indicator associated with the service zone identifier, or
    both service zone name data and at least one service zone icon indicator associated with the service zone identifier,
  wherein the service zone name data and the at least one service zone icon indicator are for displaying zone information on the mobile device.

29. The method of claim 28 wherein the IP-based wireless access network forms part of a converged telecommunications network that employs both a cellular network and an IP-based network, and wherein subscribers can access the IP-based network via wireless connections between mobile devices and wireless access points forming IP-based wireless local area networks (WLANs).

30. The method of claim 28 wherein the output based on the service zone identifier indicates changes in charges for voice calls or for data services.

31. In a telecommunications system communicating with multiple wireless devices, wherein subscribers can access the IP-based network via wireless connections between wireless devices and wireless access points, an apparatus comprising:
  at least one database; and
  at least one server coupled to communicate with the database;
  wherein the database stores data that:
    defines multiple zones of service, wherein each zone of service includes one or more access points; and,
    assigns icons and/or text data for at least some of the multiple zones;
  wherein the server is configured to:
    determine that one of the multiple wireless devices is operating within one of the multiple zones of service;
    provide, to the one wireless device, icon and/or text data assigned to the one zone of service in which the one wireless device is operating; and,
    instruct the database to store the icon and/or text data provided to the one wireless device with communication session data for communications for the one wireless device operating within the one zone of service.

32. The apparatus of claim 31 wherein the telecommunications system includes a converged telecommunications network that employs both a licensed cellular phone network and an unlicensed IP-based network, and wherein the one wireless device is a handheld device configured to provide voice communications over both the licensed cellular phone network and over the unlicensed IP-based network under a Unlicensed Mobile Access (UMA) protocol, or Generic Access Network (GAN) protocol.

33. The apparatus of claim 31 wherein the server is further configured to provide to a customer care computer the communication session data for communications for the one wireless device, including the icon and/or text data provided to the one wireless device.

34. The apparatus of claim 31 wherein the one zone of service is associated with one of the wireless access points, and wherein the one access point is a femtocell configured to communicate with the one wireless device over licensed wireless spectrum.

35. An apparatus for communicating between a mobile telecommunications device and a telecommunications network, wherein the apparatus is associated with a fixed geographic location, the apparatus comprising:
- at least one radio configured to communicate wirelessly with the mobile telecommunications device;
- at least one network communications component configured to communicate with the telecommunications network;
- at least one memory storing instructions; and
- at least one processor, coupled to the at least one radio, to the at least one communications component, and to the at least one memory, wherein the processor is configured, when executing the instructions stored in memory, to:
  - provide a registration request to the network; and,
  - receive an authorization signal for the mobile telecommunications device to access the telecommunications network, wherein the authorization signal includes:
    - service zone name data for a defined service zone associated directly or indirectly with the fixed geographic location associated with the apparatus, or
    - at least one service zone icon indicator for the defined service zone, or
    - both the service zone name data and the at least one service zone icon indicator for the defined service zone, and
  - wherein the network includes an IP-based computer network,
  - wherein the at least one radio is a IEEE 802.11 radio, and
  - wherein the network communications component is configured to access the IP-based computer network.

36. The apparatus of claim 35, wherein the at least one radio is a licensed wireless spectrum radio, and wherein the network communications component is configured to access a packet-switched data network.

* * * * *